Oct. 4, 1966  I. E. COX  3,276,289
GEAR CASE
Filed July 17, 1964  2 Sheets-Sheet 1

Inventor
Isaac E. Cox
By Wallace, Kinzer and Dorn
Attorneys

Oct. 4, 1966
I. E. COX
3,276,289
GEAR CASE
Filed July 17, 1964
2 Sheets-Sheet 2
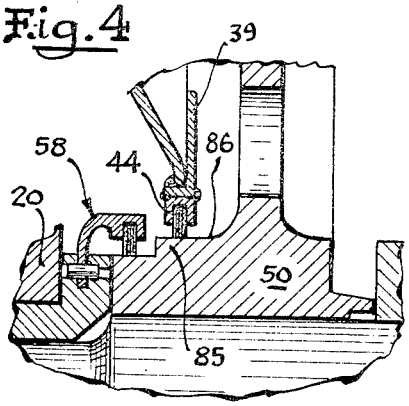
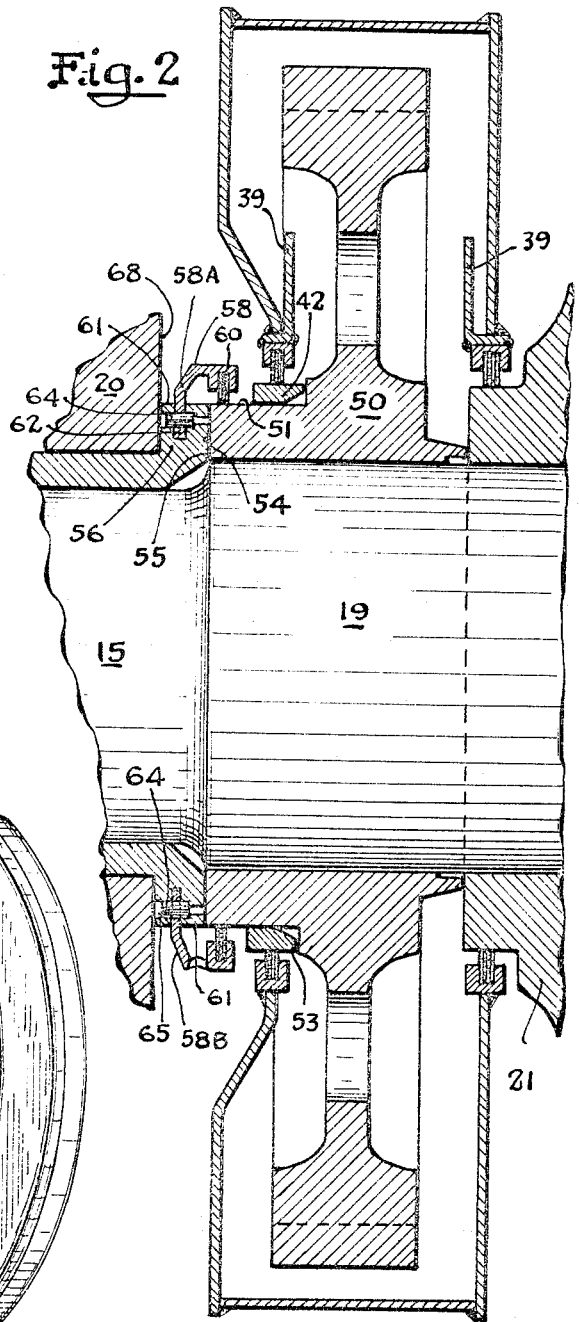
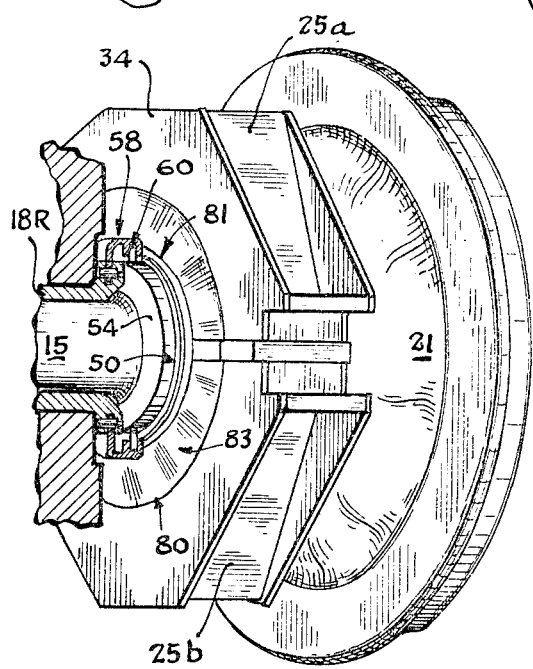
Inventor
Isaac E. Cox
By Wallace, Kinzer and Dorn
Attorneys

United States Patent Office 3,276,289
Patented Oct. 4, 1966

3,276,289
GEAR CASE
Isaac E. Cox, Kirkwood, Mo., assignor to Abex Corporation, a corporation of Delaware
Filed July 17, 1964, Ser. No. 383,393
6 Claims. (Cl. 74—606)

This invention relates to locomotive traction motor drive assemblies and more particularly to improvements in gear cases and seal elements associated with the adjacent gear and bearing on a locomotive drive axle.

In a diesel locomotive, to which the present invention is particularly adapted, a traction motor is supported by traction motor bearings disposed on an axle. The axle is free to rotate in the traction support bearings and is driven for rotation in these bearings by a pinion of the traction motor. This pinion drives a gear which is secured to the axle at a position adjacent one of the wheels affixed to the axle. The side of the traction motor adjacent the gear and pinion is commonly referred to as the "pinion end" of the traction motor and the opposite side of the traction motor is commonly designated as the "commutator end" of the traction motor.

The amount of space about the drive gear and between the drive gear and traction motor housing at the pinion side of the traction motor housing is very restricted. Within this restricted space there is provided a gear case surrounding the drive gear, a gear case seal and a bearing seal. The gear case seal is for the purposes of preventing loss of lubricant from the gear case and preventing the entrance of foreign materials into the gear case that would contaminate the gear lubricant.

A common form of gear case encloses a gear having a five-inch wide gear face disposed in a gear case of a slightly greater width. Approximately two and one-half gallons of lubricant are disposed in the bottom of the gear case. According to present practices, to initially charge the gear case with lubricant or to recharge the gear case with lubricant, charges of lubricant sealed in plastic bags are placed in the gear case so that upon rotation of the gear the bags are broken to divulge the lubricant.

The drive gear tears some of the lubricant bags and squeezes others of the bags to break the bags, and some of the lubricant is subject to relatively high pressure. A portion of this pressurized lubricant is blown through gear case seals, openings or joints, because of localized areas of high pressures. The gear lubricant is of sufficiently low viscosity to be self-leveling, that is, to flow to the bottom of the gear case and thus provide a level of lubricant through which the gear teeth dip as the gear rotates with the axle.

The level of gear lubricant within the gear case has extended upwards from the bottom of the gear case to a relatively great extent, and considerable turbulence is encountered as the gear moves through the lubricant. Interior shields or "plumbing" on the upper half of the gear case are disposed below the gear face to collect the lubricant dripping from the gear face or the sides of the gear and the shields channel and return the collected lubricant to the lower portion of the gear case. Such shields prevent the dripping of lubricant onto the gear hub and the flooding of the gear seals at the gear hub.

Under the present invention, the gear case may have approximately the same dimensions, width and diameter as a prior art gear case. However, the gear face of the drive gear within the gear case has been substantially reduced in width from the usual five inches in width to four inches in width or less so that substantially more of the interior volume of the gear case is available for lubricant. Thus, the level of the lubricant within the gear case is also substantially reduced because of the smaller amount of space taken up by the gear. Because of the lower level of lubricant and less lubricant applied to the sides of the gear, less dripping and turbulence is experienced.

A further problem with gear case seals has been the likelihood of contamination by commingling of the more viscous gear lubricant by some of the less viscous bearing lubricant moving across the seal or seals intended to prevent the commingling of the lubricant.

Accordingly, an object of the present invention is the alleviation and elimination of turbulence in the gear case lubricant and the commingling of the gear lubricant by less viscous bearing lubricant by means of a new and novel construction of a gear case and arrangement of lubricant seals.

More specifically, an object of the present invention is reduction of turbulence of the gear lubricant by affording a gear case construction having a circumferential outer and lower portion of substantially greater width than the gear face for increased lubricant capacity, and having an inner hub portion reduced in width affording the capability of spacing an attached gear case seal axially adjacent to the dust guard seal.

Another object of the invention is separation of the dust guard seal and gear case seal in an axial direction by "dishing" or flaring of the inner circumferential portion of a gear case toward the gear so as to separate the gear case seal in an axial direction from the dust guard seal. Under a further object of the invention, the gear case seal is spaced both in an axial direction from said dust guard, and radially of the dust guard seal to prevent commingling of the less viscous bearing lubricant with the more viscous gear lubricant.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 2 is a sectional view of the gear case and lubricant seals at the pinion side of the traction motor frame;

FIG. 3 is a perspective view of a gear case mounted in position; and

FIG. 4 is a partial section view showing a gear case seal in engagement with a surface on the gear.

Figure 1:
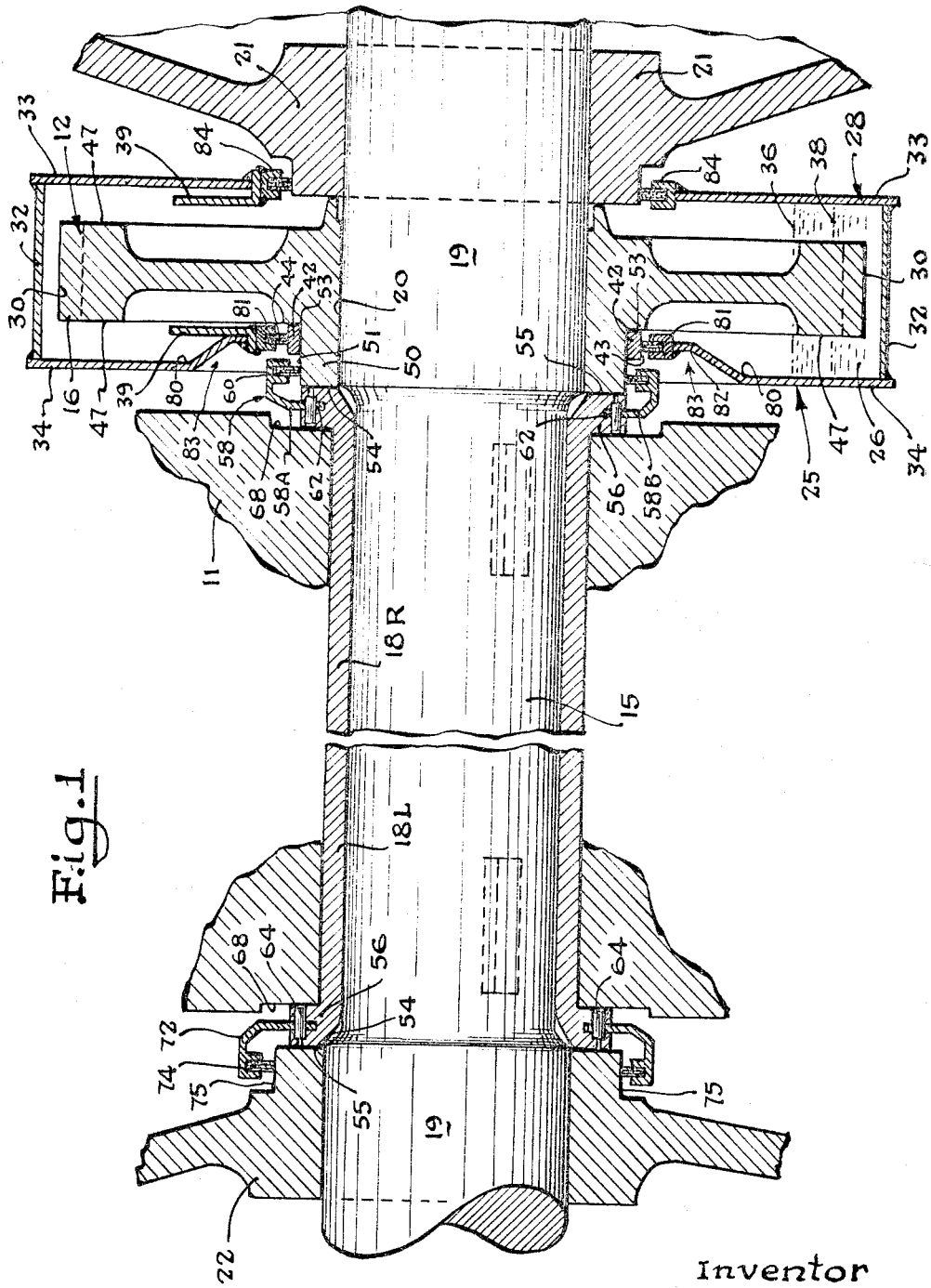
FIG. 1 is a sectional view of the drive axle of a locomotive showing a gear case and lubricant seals constructed in accordance with the preferred embodiment of the invention.

Referring now to the drawings, and more particularly to FIG. 1, there is illustrated a motor and drive assembly for a diesel locomotive which includes a traction motor housing 11, a drive gear 12, and a drive axle 15. A traction motor and a pinion gear (not shown) rotate the gear 12, and the axle 15 within bearing sleeves 18R and 18L. The drive gear 12 is secured to the axle 15 by being press-fitted on an axle hub 19 at its inner bore 20. Likewise, a pair of spaced wheels 21 and 22 are press-fitted or otherwise secured to opposite ends of the axle 15 on gear hubs 19. The bearings 18L and 18R are split bearings of the 180° type. The bearings 18L and 18R are interchangeable with one another, as in the manner more fully disclosed in the copending application of Mr. I. E. Cox, Serial No. 230,055, filed October 12, 1962 and entitled "Bearings".

The drive gear 12 rotates within a gear case or housing 25 in the bottom of which is disposed a pool of lubricant 26 for lubricating the gear teeth 16. The lubricant 26 is of such nature as to be a self-leveling lubricant, but is a relatively viscous grease compared to the less viscous lubricant or oil employed to lubricate the interfaces of the axle 15 and the bearings 18R and 18L. In a typical installation, approximately twenty-four pounds of lubricant 26 is disposed in the lower peripheral portion 28 of the gear case 25, and from a volume standpoint, approximately two and one-half gallons of lubricant are disposed within the gear case 25.

In actual practice, the gear case 25 is charged with lubricant sealed in plastic bags containing one or two-pounds of lubricant. Upon initial rotation of the gear 12, the bags are squeezed and torn between the gear 12 and the gear case 25. Some of the lubricant bags are squeezed sufficiently before breaking to cause localized areas of high pressure and to cause lubricant to be blown through small gear case openings or gear case seals. The gear case 25 is formed of approximately 180° upper and lower halves 25a and 25b, FIG. 3, fastened together in a suitable manner to make the 360° gear case 25.

In the present invention, the gear 12 has a gear face 30 of approximately four inches or less in width compared to the common five inch width of gear face or gears employed by some manufacturers. The width of the gear case is defined by the outer rim or wall 32, fabricated as by welding, to a pair of side walls 33 and 34. Preferably, the gear case 25 is of sufficient dimension at the rim 32 to contain the conventional five inch width face of a drive gear. Because of the reduced width of the gear 12, additional space or capacity for the lubricant 26 is provided. Thus, the lubricant level or depth in the gear case can be decreased. The decrease in level of lubricant may be in the order of one fourth to one half, for example, from a level 36, diagrammatically illustrated in FIG. 1, to a level 38.

Because of the decrease in depth of the lubricant, less lubricant is applied alongside the faces or walls 47 of gear 12, and less lubricant falls to be collected by baffles 39, FIG. 1. These baffles 39 are provided in the upper half 25a of the gear case for the purpose of catching lubricant dripping from the faces 47 of the gear thereby preventing the lubricant from dropping downwardly onto gear case seals 44 and 84 in such quantities as to flood these gear case seals and thereby render them less effective. Because of the reduced turbulence of the gear lubricant by the gear 12 and the reduced amount of lubricant coating of the side walls 47 of the gear face 30, the amount of lubricant being collected by baffles 39 has been substantially reduced in the present invention.

In the embodiment of the invention shown in FIGS. 1, 2 and 3, the gear 12 has a gear hub 50 with an outer circumferential machined surface 51 on which is pressed the gear seal ring 42 which abuts a radially directed shoulder 53 on the gear hub 50. The circumferential surface 51 extends from shoulder 53 towards the traction motor housing 11 to meet, at right angles, a thrust surface 54 machined on the gear hub 50 and adapted to be engaged by a thrust surface 55 on a thrust flange 56 of a bearing 18R. To protect the thrust surfaces 54 and 55, the thrust flange 56 is provided with a dust guard 58 having an annular seal 60 of felt or the like disposed in sealing engagement with the machined circumferential surface 51 on the gear hub 50.

The dust guard 58 is formed of upper and lower 180° sectors 58A and 58B, which are joined together to make a full 360° dust guard. The seals 60 are 180° seals and are co-terminal with the 180° dust guard sectors 58A and 58B to which the respective seals 60 are secured. The dust guard 58 and seals 60 encircle the thrust surface 54 and 55 to prevent entrance of foreign materials into these thrust bearing surfaces 54 and 55.

Preferably, the dust guard 58 is a light-weight plastic type of dust guard made of polycarbonate plastic material having approximately one-eighth the weight of an aluminum dust guard and one-sixteenth the weight of steel or malleable dust guard.

The dust guard 58 is secured to the thrust flange 56 on a bearing by an annular attaching flange 62 inserted in an open annular slot formed in the outer circumferential surface 61 of the thrust flange 56. Each of the semi-annular attaching flanges 62 has a series of spaced openings to receive a series of retainer pins 64, FIG. 2, inserted in axially directed openings 65 in the bearing thrust flange 56. The retainer pins 54 are wedged in these openings 65 in the thrust flange 56, and the retainer pins have one end abutted against the side 68 of the traction motor housing 20. The motor housing 20 prevents the retainer pins 54 from vibrating loose and moving axially outwardly of the openings 65.

The bearing 18L is identical in size and shape to bearing 18R, and likewise has a dust guard 72, of the same kind as dust guard 58, secured in the thrust flange 56 by retainer pins 64. The dust guard 72 is similar in construction to the dust guard 58 in all respects, except that it is of a slightly larger diameter and employs a slightly larger diameter seal 74, which is in engagement with a machined circumferential surface 75 on the wheel 22. The seal 74 prevents entrance of dirt and other foreign matter into the thrust bearing surfaces 54 and 55. Preferably, the dust guard seal 74 is the same diameter as the gear case seal 44 so that only a single inventory of seals is needed. That is, the same seal can be interchangeably employed for either the dust guard 72 or for the gear case 25. A further description of the bearings 18R and 18L and the advantages thereof, as well as the advantages of the dust guards of the type shown in the present invention, is set forth in the above mentioned co-pending application.

It is an important aspect of the invention that the gear case seal 44 be spaced from the dust guard seal 60 in an axial direction to prevent the commingling of the bearing lubricant and gear lubricant. Heretofore, considerable difficulty has been experienced in affording a sealing arrangement to prevent such commingling of lubricants. The advantage in spacing the gear seals 60 and 44 from each other in an axial direction is that any bearing lubricant escaping under the seal 60 and moving across the circumferential surface 51 will have a chance to be thrown from the surface 51 and will most likely be thrown from the surface 51 into the atmosphere prior to reaching the seal 44.

Under the present invention, the inner and smaller diameter portion of the gear case is "dished in" or turned inwardly from an outer juncture 80 to an inner juncture adjacent which a gear seal holder 81 is welded to a portion 82 of the dished in section 83. With the prior art wide gear faces, it was not possible to separate the dust guard and gear case seals axially and still afford sufficient space between the two gear case, seal holders to pass over the gear face 30 without interference therewith. However, under the present invention, the narrowed gear face 30 permits the inward spacing of gear seal holder 81 toward gear seal holder 84, while permitting insertion and removal of the gear case 25 over the gear 12.

For the purpose of preventing commingling of the bearing lubricant and gear lubricant, the dust guard seal 60 and gear case seal 44 are also spaced radially, that is, the seals 60 and 44 engage circumferential surfaces 51 and 43, respectively, each of which has a different diameter. Thus, lubricant moving under either one of these seals 60 or 44 both axially and radially defines a tortuous and longer path therebetween than merely a straight axial or straight radial path. Hence, any lubricant moving under one of the seals 44 or 60 will be more likely to be thrown from the gear during rotation of the gear hub 50 prior to moving over such a path to reach the other seal.

In FIG. 4, there is shown another embodiment of the invention wherein the gear seal ring 42 has been eliminated and the gear 12 has been provided with integral shoulder 85 with an exterior circumferential surface 86 adapted to be engaged by the gear case seal 44 in the same manner that the seal ring 42 was engaged by the gear case seal 44. The gear seal ring 42 was included, in the hereinbefore described embodiment of the invention, to adapt the presently produced gears 12 to provide separate and radially offset seal engaging surfaces 51 and 43. Economically, it will be better practice to afford additional hub stock on the gear 12 to provide the circumferential, seal engaging surface 86 rather than making a separate seal ring 42 and press-fitting or otherwise securing the seal ring 42 in place on the hub 50. The gear case seal ring 44, is in effect a portion of the hub of the gear 12 and the ring 44 is equivalent to having an integral portion on the hub.

From the foregoing, it will be seen that the present invention provides an improved sealing arrangement wherein the gear and dust guard seals are spaced axially to prevent commingling of the bearing lubricant and gear lubricant. Also, the present invention affords an improved gear case having an enlarged capacity for lubricant and inwardly dished or flared portion to axially space the gear case seal from a dust guard seal adapted to contact the gear hub.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims:

I claim:
1. A sealing arrangement for a drive gear and for the thrust bearing surfaces on the gear and on a bearing, comprising an annular dust guard means adapted to be secured to said bearing and including a sealing element adapted for sealing engagement with a hub of said gear; a gear case means surrounding said gear and adapted to receive a supply of gear case lubricant, and sealing means for sealing said gear case means and against the loss of gear lubricant from said gear case means, said sealing means including a seal engaging said gear hub and spaced from said dust guard sealing element in an axial direction along said gear hub to provide a space between said seal and sealing element that is exposed to the ambient atmosphere, the portion of said gear hub which is engaging said sealing element being spaced radially from said portion of said gear hub which is engaging said seal to provide both axial and radial spacing between said seal and sealing element.

2. In combination with a locomotive drive assembly, a sealing arrangement for an axle bearing, and a drive gear for the axle, said bearing and drive gear having mating thrust surfaces; an annular dust guard means for preventing entrance of foreign matter between thrust bearing surfaces on said gear and bearing; a sealing element secured to said bearing dust guard and having said sealing element in sealing engagement with the hub of said gear; a gear housing means surrounding said gear and adapted to receive a supply of gear case lubricant, and gear case sealing means for sealing said gear case against entrance of foreign matter into said gear housing means, and the loss of gear lubricant from said gear housing means, said gear housing means including an outer rim, a pair of attached side walls extending along the sides of said gear toward the hub of said gear, said side wall extending toward said dust guard being flared from said dust guard means and being flared towards said other side wall; said gear case sealing means including a seal secured to said wall which is flared in order to space said seal from said dust guard means.

3. The combination of claim 2 wherein said gear has a hub with two separate surfaces spaced from one end in a radial direction and wherein said seal is in sealing engagement with one of said surfaces and the sealing element is in sealing engagement with the other of said surfaces on said hub.

4. A sealing arrangement for a locomotive drive assembly having a wheel and a drive gear secured to an axle mounted in a bearing, said sealing arrangement for preventing intermingling of lubricant of the drive gear with the less viscous lubricant for an axle bearing having a thrust collar adjacent a hub on said drive gear, annular dust guard means secured to said bearing for preventing the entrance of foreign matter into said bearing, sealing means secured to said dust guard means and extending into sealing engagement with the hub of said gear for preventing loss of bearing lubricant from the bearing, gear housing means surrounding said gear and adapted to receive said gear lubricant, first sealing means on said gear housing means for sealing engagement with the hub of said wheel to prevent the entrance of said foreign matter into said gear housing means and the loss of said gear lubricant from said gear housing means, a second sealing means on said gear housing means for sealing engagement with the hub of the drive gear for preventing the intermingling of gear and bearing lubricant, said gear housing means having an outer peripheral portion of substantially greater width than the portion of said gear housing means carrying said first and second sealing means and providing a reservoir for said gear lubricant in the outer peripheral portion of said gear housing means.

5. In the sealing arrangement of claim 4 wherein said first and second sealing means on said gear housing means and the sealing means on the dust guard are of the same diameter and are interchangeable with one another.

6. A gear case housing for fitting about a drive gear of a locomotive and for sealing engagement with a hub of a drive gear and a hub of a wheel, said housing comprising:
 (a) an annular body portion with an outer rim wall,
 (b) a first side wall attached to said rim wall and extending inwardly to a central opening therein, a second side wall attached to said rim wall and spaced from said first side wall and extending inwardly to a central opening therein,
 (c) at least one of said walls being flared inwardly toward the other side wall to reduce the spacing therebetween at central openings thereby affording a wider lubricant reservoir at the outer rim wall,
 (d) first sealing means secured to said one side wall for sealing engagement with the hub of the drive gear,
 (e) second sealing means secured to the other side wall for sealing engagement with said hub of said wheel,
 (f) and baffle means on the respective side walls and extending inwardly to collect and to divert lubricant from falling and flooding said first and second sealing means.

References Cited by the Examiner

UNITED STATES PATENTS

| 801,153 | 10/1905 | Newton | 308—36.1 |
|---|---|---|---|
| 1,264,247 | 4/1918 | Wygodsky | 308—36.2 |
| 2,324,688 | 7/1943 | Finlayson et al. | 277—58 |

FOREIGN PATENTS 249,868  3/1961  Australia.

FRED C. MATTERN, JR., *Primary Examiner.*

MILTON KAUFMAN, *Examiner.*

W. S. RATLIFF, JR., *Assistant Examiner.*